US012589337B2

(12) United States Patent (10) Patent No.: US 12,589,337 B2
Bassi et al. (45) Date of Patent: Mar. 31, 2026

(54) FILTER PRESS WITH MULTI-FUNCTION ROBOT FOR MAINTENANCE, TRACKING AND WEAR CONTROL OF FILTERING SEPTA

(71) Applicant: DIEMME FILTRATION S.R.L., Lugo (IT)

(72) Inventors: Andrea Bassi, Faenza (IT); Davide Collini, Lugo (IT); Roberto Dardi, Massa Lombarda (IT)

(73) Assignee: DIEMME FILTRATION S.R.L., Lugo (IT)

( * ) Notice: Subject to any disclaimer, the term of this patent is extended or adjusted under 35 U.S.C. 154(b) by 460 days.

(21) Appl. No.: 18/261,908

(22) PCT Filed: Jan. 14, 2022

(86) PCT No.: PCT/IB2022/050290

§ 371 (c)(1),
(2) Date: Jul. 18, 2023

(87) PCT Pub. No.: WO2022/157608

PCT Pub. Date: Jul. 28, 2022

(65) Prior Publication Data

US 2024/0075412 A1 Mar. 7, 2024

(30) Foreign Application Priority Data

Jan. 22, 2021 (IT) ........................ 102021000001145

(51) Int. Cl.
B01D 25/172 (2006.01)
B01D 25/00 (2006.01)
(Continued)

(52) U.S. Cl.
CPC ......... B01D 25/172 (2013.01); B01D 25/003 (2013.01); B01D 25/386 (2013.01);
(Continued)

(58) Field of Classification Search
CPC .. B01D 25/172; B01D 25/003; B01D 25/386; B01D 25/164; B01D 25/00; B01D 25/38;
(Continued)

(56) References Cited

FOREIGN PATENT DOCUMENTS

CN 212236135 U 12/2020
KR 101952077 B1 2/2019
(Continued)

*Primary Examiner* — Akash K Varma
(74) *Attorney, Agent, or Firm* — FisherBroyles, LLP; Roger L. Browdy

(57) ABSTRACT

A filter press (100) is described comprising: a plurality of filtration chambers (155) each of which is delimited by two mutually facing filtering septa (140, 145) interposed between a pair of containment plates (105), a movement apparatus adapted to move each pair of containment plates (105) between a closed configuration and an open configuration, an inlet hydraulic circuit of the liquid to be filtered, an outlet hydraulic circuit of the filtered liquid, and a washing robot (400) adapted to wash the filtering septa (140, 145) that delimit each filtration chamber (155), wherein said washing robot (400) comprises: a trolley (405) adapted to move along a longitudinal direction (A) with respect to the containment plates (105), a bar (445) installed on the trolley (405) and movable relative thereto in a transverse direction with respect to the longitudinal direction (A), and a plurality of nozzles (450) installed on said bar (445) to dispense jets of a washing liquid toward said filtering septa (140, 145), the filter press further comprising: a plurality of identification codes, each of which is fixed to at least one respective filtering septum (140, 145), a device for detecting said identification codes installed on the trolley (405) of the washing robot (400), at least one image acquisition device (600) installed on the bar (445) of the washing robot (400) to acquire images of said filtering septa (140, 145), and an electronic processing unit connected to the identification (Continued)

code detection device and to the image acquisition device (600).

12 Claims, 14 Drawing Sheets

(51) Int. Cl.
    *B01D 25/38*         (2006.01)
    *B01D 35/143*      (2006.01)

(52) U.S. Cl.
    CPC ........ *B01D 35/143* (2013.01); *B01D 2201/52*
                    (2013.01); *B01D 2201/54* (2013.01)

(58) Field of Classification Search
    CPC .. B01D 25/12; B01D 35/143; B01D 2201/52;
                       B01D 2201/54; G06Q 10/00
    USPC .......................................................... 210/85
    See application file for complete search history.

(56)                 References Cited

FOREIGN PATENT DOCUMENTS

WO      WO-2011092376 A1 *  8/2011  ............. G06Q 10/00
WO      WO-2020208534 A1 *  10/2020  ........... B01D 25/172

* cited by examiner

310

330

300

105

405

335

335

415

400

105

370

360

325

360

350

360

A

FILTER PRESS WITH MULTI-FUNCTION ROBOT FOR MAINTENANCE, TRACKING AND WEAR CONTROL OF FILTERING SEPTA

TECHNICAL FIELD

The present invention relates to filter presses which are commonly used to filter liquid substances containing suspended solids (known as solid-liquid suspensions), typically sludges that may come from both civil and industrial wastewater purification processes or from numerous other production processes, typically but not exclusively chemical/pharmaceutical or mining.

PRIOR ART

As is well known, a filter press generally comprises an array of containment plates, which are arranged in sequence along a predetermined horizontal direction.

Between each pair of containment plates there are two mutually facing filtering septa, typically two portions of filtering cloth, each of which is adapted to cover one of the main faces of the containment plate adjacent thereto.

Each pair of containment plates is movable between a closed and an open configuration. In the closed configuration, the containment plates are clamped in a packet against the filtering septa interposed between them, thus delimiting a filtration chamber.

In the open configuration, the containment plates are spaced apart, separating the corresponding filtering septa and opening the filtration chamber laterally.

Through a suitable inlet hydraulic circuit, the sludge to be filtered is fed into the filtration chambers when all the containment plates are in a closed configuration.

In this way, the solid fraction of the sludge remains confined within the filtration chambers, where it forms a compact residue, while the liquid fraction passes through the filtering septa to a hydraulic outlet circuit, through which it can be discharged or collected.

At the end of this filtration cycle, the pairs of containment plates are brought, either simultaneously or one at a time, into an open configuration, so that the solid deposit can fall outside the filtration chambers.

Since some of the solid material may foul the filtering septa that delimit the filtration chamber, said filtering septa may be periodically subjected to a washing step using high-pressure water jets.

This washing phase can be carried out in an automated manner with the aid of a robot, which generally comprises a trolley adapted to move along the alignment direction of the containment plates, and a bar, moving transversely on board the trolley, which is de-signed to insert itself and slide between each pair of containment plates in open configuration and therefore between the corresponding filtering septa.

Dispensing nozzles are installed on this bar which, connected to a suitable water supply circuit, are able to deliver high-pressure water jets against both filtering septa, cleaning the solid residues off them.

Apart from these regular cleaning operations, the filtering septa are subject to progressive wear and tear and must therefore be replaced regularly.

Currently, this replacement can be carried out according to two different approaches.

The first approach follows the logic of so-called "preventive maintenance" and consists of the preventive replacement of all the filtering septa after a certain number of filtration cycles.

For this approach to be effective, however, the number of filtration cycles leading to the replacement of the filtering septa must be sufficiently low so that none of them breaks before replacement, which obviously means that some filtering septa may be replaced prematurely, with obvious waste of resources and increased costs.

Furthermore, the determination of this number of filtration cycles can only be made on the basis of an average wear pattern in the filtering septa and cannot take into account accidental events that could cause unexpected damage.

In fact, a filtering septum can be damaged not only by wear and tear but also by other factors, such as the presence of large particles (a few millimetres) that impact violently against the filtering septum due to the high flow rate/speed at which the sludge is fed, causing it to break prematurely.

To try to overcome these drawbacks, the second approach that has been proposed is one that follows the logic of so-called "incidental or event-based maintenance".

It consists of replacing one or more filtering septa only when a malfunction of the filter press is detected.

In particular, a turbidity meter is generally used to measure the turbidity of the filtered liquid leaving the filter press through the hydraulic outlet circuit.

If the turbidity measured is above a predefined threshold value, this means that part of the solid phase contained in the sludge has passed through a breakage that has formed in at least one filtering septum.

When this occurs, an operator will manually inspect all the filtering septa installed on the filter press to identify the one(s) where the breakage has effectively occurred, which will therefore be replaced.

However, it is clear that this second approach can lead to long production downtime and a lot of work for the operators who have to check the filtering septa.

As well as being laborious, this activity can also be difficult to carry out, since, in some types of filter press, the space available between two containment plates in the open configuration can be rather narrow, making it very difficult and sometimes even impossible to inspect the filtering septa accurately.

DISCLOSURE OF THE INVENTION

In light of the above, an object of the present invention is to solve, or at least significantly mitigate, the mentioned drawbacks of the prior art.

Another aim of the present invention is that of reaching the aforesaid objective within the context of a simple, rational and relatively cheap solution.

These and other objects are achieved thanks to the characteristics of the invention re-ported in the independent claims. The dependent claims outline preferred and/or particularly advantageous aspects of the invention which however are not strictly required for the implementation thereof.

In particular, an embodiment of the present invention makes available a filter press comprising:

- a plurality of filtration chambers aligned along a predetermined longitudinal direction, each of which is delimited by two mutually facing filtering septa interposed between a pair of containment plates,
- a movement apparatus adapted to move each pair of containment plates along said longitudinal direction, between a closed configuration, in which the containment plates are clamped into a pack on the respective filtering septa closing the filtration chamber, and an open configuration, in which the containment plates are spaced apart so as to separate the respective filtering septa laterally opening the filtration chamber, an inlet hydraulic circuit adapted to feed a liquid to be filtered inside each filtration chamber, when all the pairs of containment plates are in the closed configuration, an outlet hydraulic circuit adapted to discharge the filtered liquid leaving each filtration chamber through the respective filtering septa, when all the pairs of containment plates are in the closed configuration, and a washing robot adapted to wash the filtering septa that delimit each filtration chamber, when the respective pair of containment plates is in the open configuration, wherein said washing robot comprises:

a trolley adapted to move along said longitudinal direction with respect to the containment plates, a bar installed on the trolley and movable relative thereto in a transverse direction with respect to the longitudinal direction, in order to slide between the filtering septa interposed between the pair of containment plates in the open configuration, and a plurality of nozzles installed on said bar to dispense jets of a washing liquid toward said filtering septa, and wherein the filter press also comprises:

a plurality of (unique) identification codes, each of which is fixed to at least one respective filtering septum, a device for detecting said identification codes installed on the trolley of the washing robot, at least one image acquisition device installed on the bar of the washing robot to acquire images of said filtering septa and an electronic processing unit connected to the identification code detection device and to the image acquisition device.

Thanks to this solution, by exploiting the same mechanical infrastructure already present on board the filter press, i.e. the washing robot, it is advantageously possible to identify the filtering septa that have been installed on the filter press and, if necessary, to store for each of them the position, the number of filtration cycles it has performed and many other characteristic data, the latter data being able to be effectively represented and/or assessed by means of the images taken by the acquisition device which, thanks to the movement of the bar, can effectively scan the filtering septa.

In this way, it is advantageous to be able to check the state of use of the filtering septa, without the need for an operator to physically enter between the containment plates of the filter press, in a simpler and quicker way with respect to the known technique and in a generally more effective way, since the movement of the bar can allow the acquisition device to take images of each zone of the filtering septum.

It is precisely because of this simplicity and speed of scanning that the filtering septa can also be checked more frequently, e.g. during or after each washing operation, and not just when a malfunction is detected.

In particular, it is possible to keep track of the progressive wear of each filtering septum up to breakage.

This makes it possible to collect a vast amount of data and information, which can be combined with information about the filtration process, such as the degree of abrasiveness of the liquid (sludge) to be filtered or the filtration pressures, can make it possible to construct a model (e.g. mathematical, statistical or empirical) that effectively describes the trend in the wear of the filtering septa in relation to the time of use or the number of filtration cycles carried out.

From this model, an evaluation logic can then be developed which allows the progressive deterioration of the filtering septum to be recognised on the basis of the images acquired of each filtering septum and to diagnose in a predictive manner how long or how many filtration cycles the filtering septum can still be used before it becomes damaged or ineffective.

This model and/or this evaluation logic can be obtained, for example, by means of an artificial intelligence system that self-learns the evolution of wear, through the analysis and/or processing of the images of each filtering septum taken by the acquisition device over time, i.e. after a progressively increasing number of filtration cycles carried out. In this way, it can be advantageously possible to implement a predictive logic that allows each filtering septum to be replaced before a malfunction occurs in the filter press, but only when it is actually needed, thus reducing machine downtime, maximizing the life of the filtering septa and minimizing maintenance costs.

In this respect, one aspect of the invention envisages that the electronic processing unit can be configured to:

identify at least one filtering septum by detecting the corresponding identification code by the detection device, acquire with the acquisition device at least one image of said filtering septum, determine, on the basis of said at least one image, a residual duration of said filtering septum.

With this solution, the electronic processing unit will be able to automatically provide operators with the estimated residual duration of each filtering septum, e.g. through an ap-propriate interface system (typically through a monitor), allowing them to appropriately schedule its replacement.

In particular, said electronic processing unit may be configured to determine the residual duration of the filtering septum by running an evaluation logic (such as that outlined above) which receives as input said at least one image and provides as output the residual duration.

According to another aspect of the invention, the electronic processing unit can also be configured to:

acquire in successive times with the acquisition device a plurality of images of a plurality of said filtering septa, modify the assessment logic based on said images, e.g. with an artificial intelligence system.

In this way, the electronic processing unit can put into practice the self-learning functionality that enables it to provide safer and more reliable predictive evaluations, also taking into account the conditions of use of each filter press.

Another aspect of the invention (alternative or additional to the foregoing) provides that the electronic processing unit may be configured to:

identify at least one filtering septum by detecting the corresponding identification code by the detection device, acquire with the acquisition device at least one image of said filtering septum, determine, on the basis of said at least one image, the presence of any damage to said filtering septum; said damage may be determined when present at an early stage (e.g., abrasions or micro-lesions) and/or when present at an advanced stage (e.g., macro-lesions).

Thanks to this solution, the electronic processing unit be able to automatically detect any damage to the filtering septum that leads to its breakage and/or could lead to its breakage in a short time, for example to inform the operators of such an eventuality allowing them to intervene promptly.

According to another aspect of the invention, the filter press may further comprise a second plurality of (unique) identification codes, each of which is fixed to a respective containment plate and is adapted to be detected by the identification code detection device, for example by the same one that also detects the identification codes of the filtering septa or possibly by another dedicated detection device.

With this solution it is advantageous to keep track of each containment plate, for example to find out/monitor its position inside the filter press or to count its time of use, typically in terms of the number of filtration cycles carried out, which can be useful to allow the scheduling of any maintenance and/or replacement of the containment plates as well.

In more detail, one aspect of the invention envisages that each identification code may be embedded in an RFID tag and that the detection device may comprise at least one receiving antenna capable of picking up a radio signal emitted by said RFID tag.

This aspect provides a particularly simple and reliable solution for equipping each filtering septum with an identification code that can be read by automatic systems.

However, it is not excluded that, in other embodiments, the identification code may be encoded in a graphic form, e.g. in a bar code or a QR code, and that the detection device may be an optical device capable of reading said graphic form.

Another aspect of the invention is that the RFID tag can be of a writable type.

In this way, the RFID tag is able to store some relevant information of the respective filtering septum (e.g. make and model, position within the pack of containment plates and number of filtration cycles performed), which can also be periodically updated according to usage.

According to one aspect of the invention, the detection device may also comprise a reader connected to the receiving antenna, for example via a PROFINET interface, and adapted to decode the radio signal emitted by the RFID tag.

This reader can also be placed on board the trolley of the washing robot, but preferably in a different position with respect to the receiving antenna, e.g. at a higher level, in order to be better protected.

Another aspect of the invention is that the image acquisition device may be a camera or video camera.

In this way, the image acquisition device can take not only static images but also actual films of the filtering septa.

In particular, the filter press may comprise at least two of said image acquisition devices installed on the bar of the washing robot, wherein a first image acquisition device faces one of said filtering septa, and a second image acquisition device faces the other filtering septum.

Thanks to this solution, with only one stroke of the washing robot bar, it can be effectively possible to take images of both filtering septa.

Of course, if the size of the filtering septa is particularly large and/or the distance between the containment plates in an open configuration is particularly small, the filter press may comprise a larger number of image acquisition devices installed on the bar of the washing robot, for example two or more image acquisition devices facing one filtering septum and two or more further image acquisition devices facing the other filtering septum.

Another embodiment of the present invention also provides a method of operating the above-described filter press, which comprises the steps of:

stopping the trolley of the washing robot at a pair of containment plates in the open configuration, detecting with the detection device the identification code of at least one of said filtering septa interposed between said pair of containment plates, moving the bar of the washing robot between the filtering septa interposed between said pair of containment plates, acquiring at least one image of said at least one filtering septum by means of the image acquisition device installed on the bar of the washing robot.

This method essentially achieves the same advantages as mentioned above, in particular that of allowing a simple and accurate assessment of the state of wear and/or integrity of each filtering septum.

Consistent with the foregoing, the method may further comprise the step of determining the presence of any damage and/or residual duration of said at least one filtering septum based on the acquired images.

The determination of the residual duration can be carried out according to an evaluation logic that receives as input said at least one image and provides as output the residual duration.

The method may also include the additional steps of:

acquiring in successive times with the acquisition device a plurality of images of a plurality of said filtering septa, and modifying the assessment logic based on said images.

BRIEF DESCRIPTION OF THE DRAWINGS

Further features and advantages of the invention will be more apparent after reading the following description provided by way of a non-limiting example, with the aid of the ac-companying drawings.

DETAILED DESCRIPTION

The attached figures show filter presses 100, which are generally suitable for filtering liquid substances in which suspended solids, known as solid-liquid suspensions, are dispersed.

For example, filter presses 100 can be used to filter sludge from both civil and industrial wastewater treatment processes, or from other technological processes, typically but not exclusively chemical/pharmaceutical or mining.

Each filter press 100 comprises a plurality of containment plates 105 mutually aligned along a predetermined longitudinal direction A, preferably horizontal.

Each of these containment plates 105 is generally shaped like a thin body having two main faces of a larger size, mutually opposed and substantially parallel, and a (much) smaller thickness than the size of the main faces.

The containment plates 105 are oriented orthogonally with respect to the longitudinal direction A, which is thus substantially parallel to their thickness, and are arranged in succession along said longitudinal direction A, so that they are adjacent to one other.

In particular, each containment plate 105 may have a substantially rectangular or square shape, comprising a lower flank, an upper flank and two lateral flanks, which define the perimeter of the main faces.

Regardless of their specific shape, the containment plates 105 of each filter press 100 may be identical to one other and may be arranged so as to be mirrored two by two.

Figures 1, 1A:
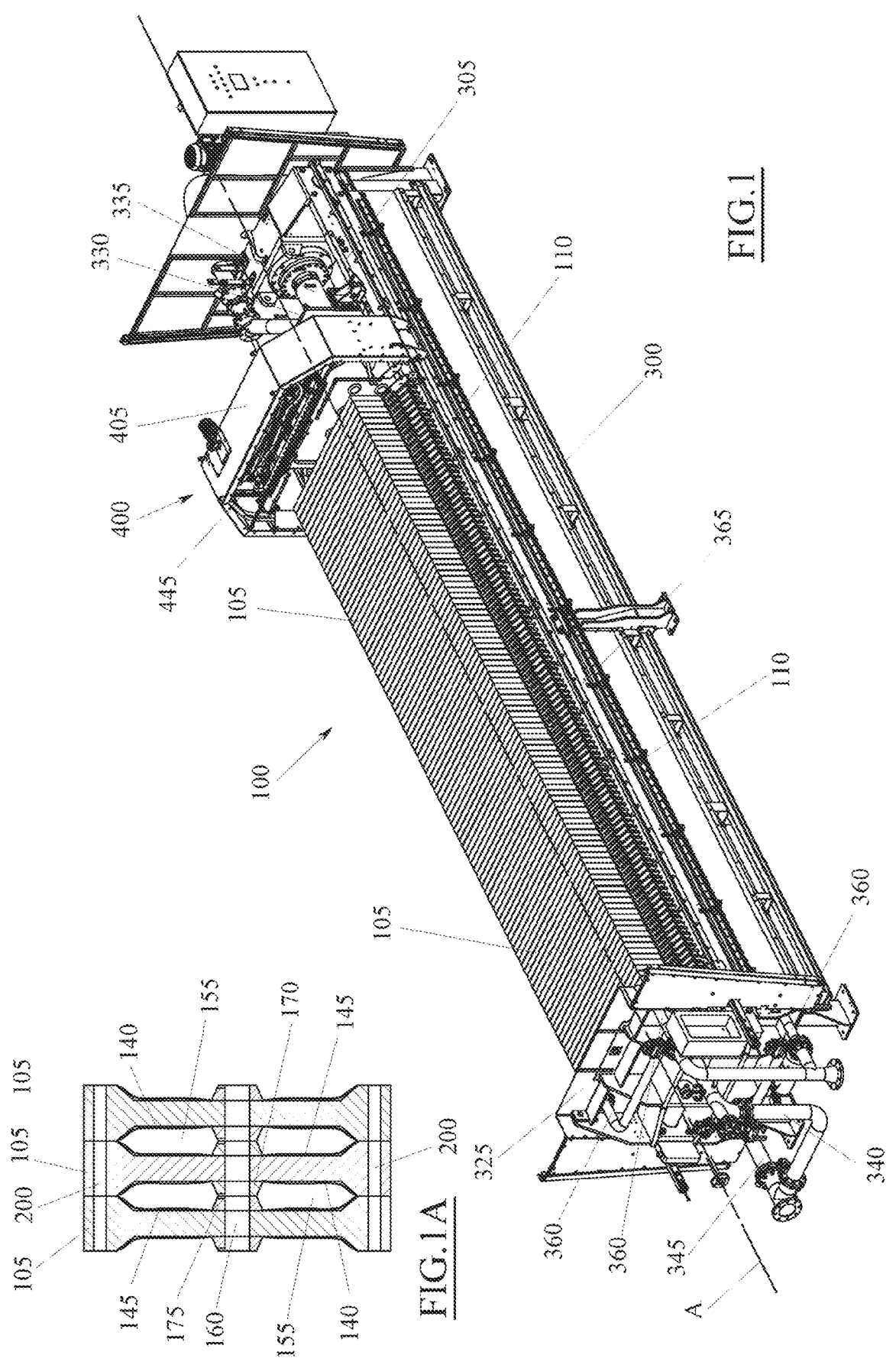
FIG. 1 is an axonometric view of a filter press according to an embodiment of the present invention.
FIG. 1A is a schematic section of a portion of the pack of containment plates of the filter press of FIG. 1, performed in a plane of vertical section and containing the longitudinal axis A.
Figure 2:
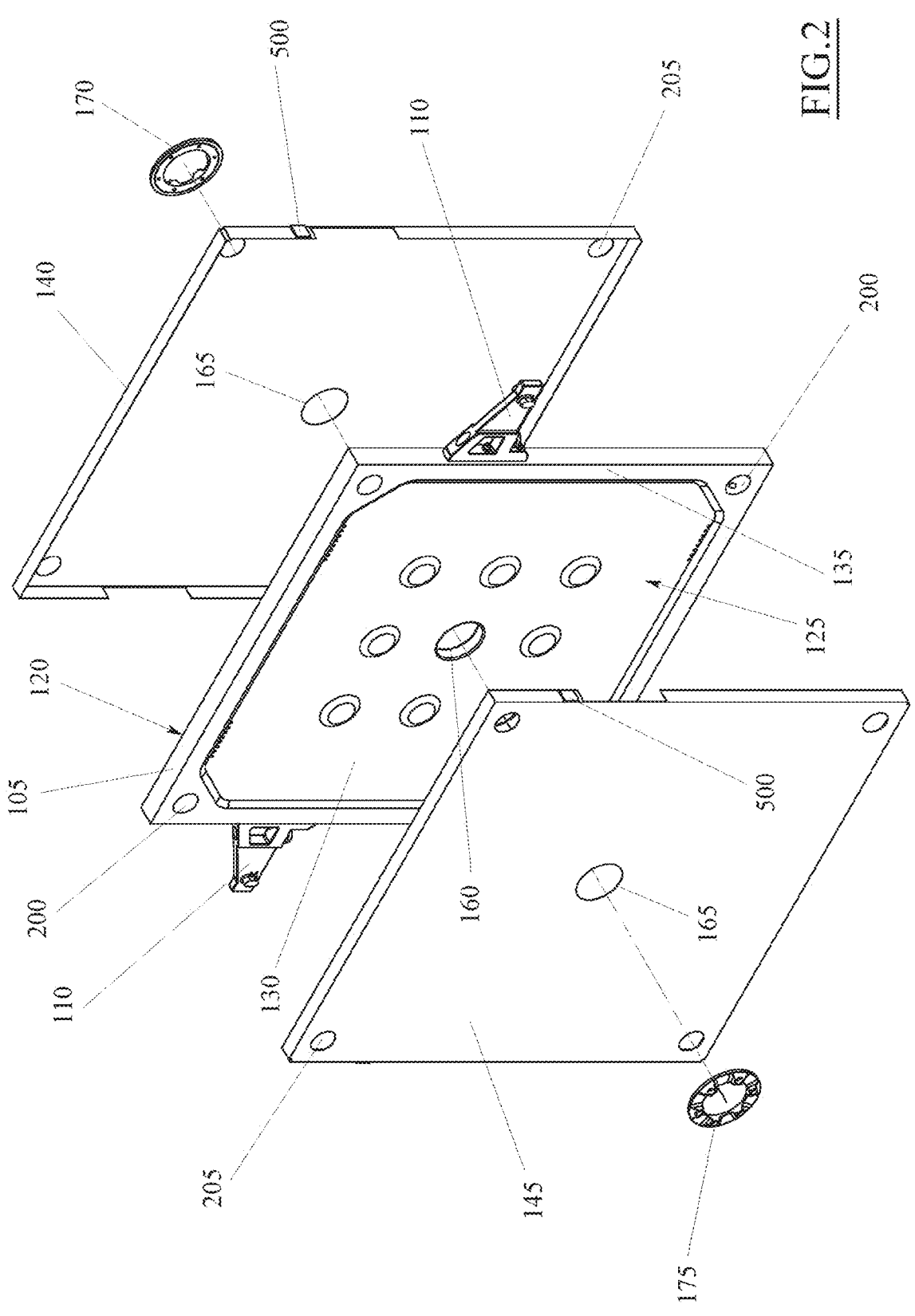
FIG. 2 is an exploded axonometric view of a containment plate belonging to the filter press of FIG. 1 and the related filtering septa.

The containment plates 105 are slidably associated with a support structure 300, with respect to which they can slide in a direction parallel to the longitudinal direction A. In the embodiment of FIGS. 1 and 2, the support structure 300 comprises two guide rails 305 parallel to the longitudinal direction A and lying in a preferably horizontal plane (only one of which is visible in FIG. 1).

A bracket 110 protrudes cantilevered from the lateral flanks of each containment plate 105, which is slidably supported on a respective guide rail 305 of the support structure 300.

Figure 5:
FIG. 5 is an axonometric view of a filter press according to a further embodiment of the present invention.
Figure 6:
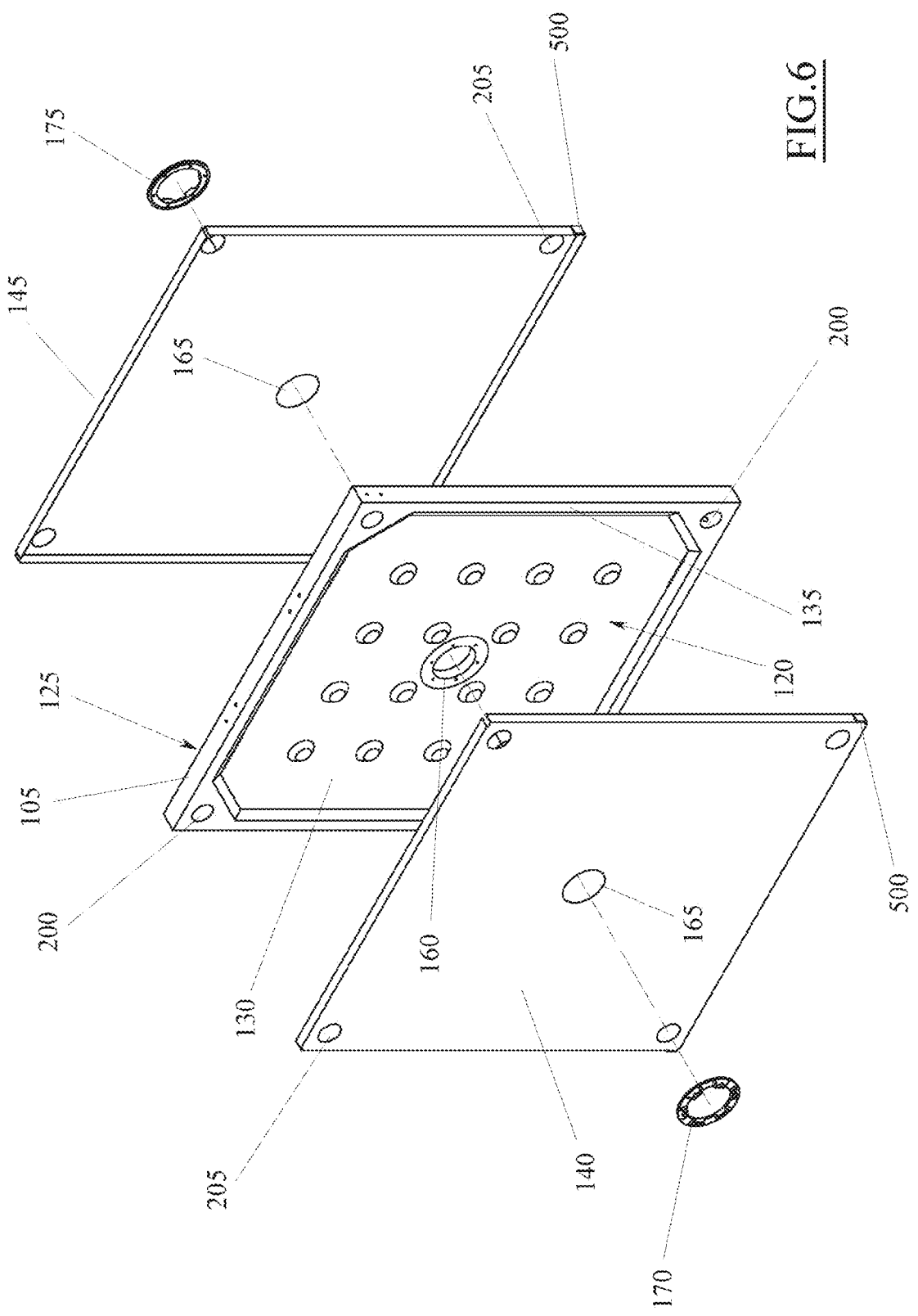
FIG. 6 is an exploded axonometric view of a containment plate belonging to the filter press of FIG. 5 and the related filtering septa.

In the embodiment of FIGS. 5 and 6, the support structure 300 comprises a longitudinal member 310 extending parallel to the longitudinal direction A, overlying the containment plates 105.

Figure 11:
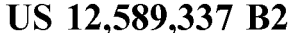
FIG. 11 is an axonometric view of a filter press according to a third embodiment of the present invention.
Figure 12:
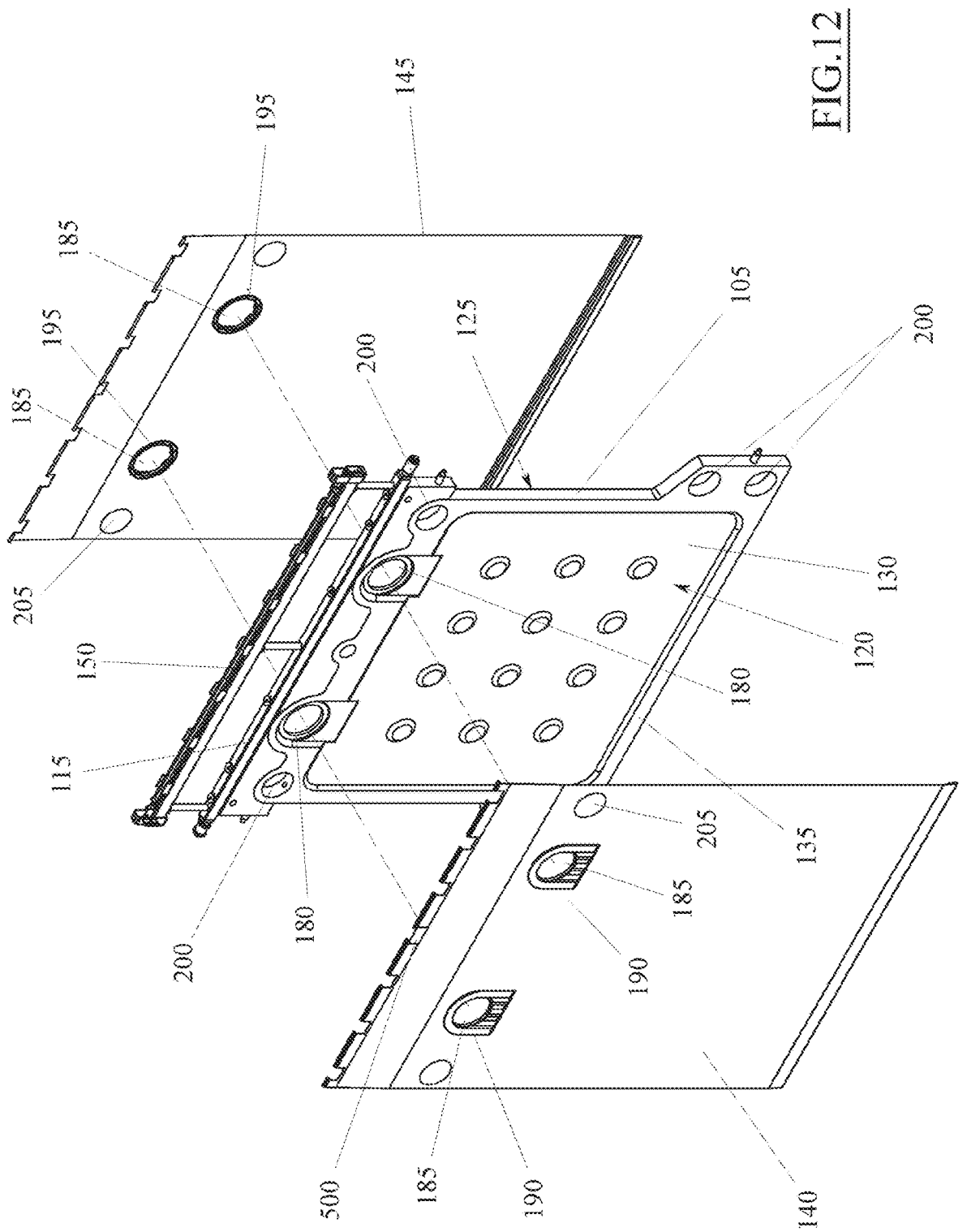
FIG. 12 is an exploded axonometric view of a containment plate belonging to the filter press of FIG. 11 and the related filtering septa.

Hooks (not illustrated) may be fixed to the upper flank of each containment plate 105, which are slidably suspended from the same number of guide bars (also not illustrated) fixed to the support structure 300 and extending parallel to the longitudinal member 310. In the embodiment of FIGS. 11 and 12, the support structure 300 comprises a pair of longitudinal members 315 parallel to the sliding direction A, between which the containment plates 105 are interposed.

Figure 15:
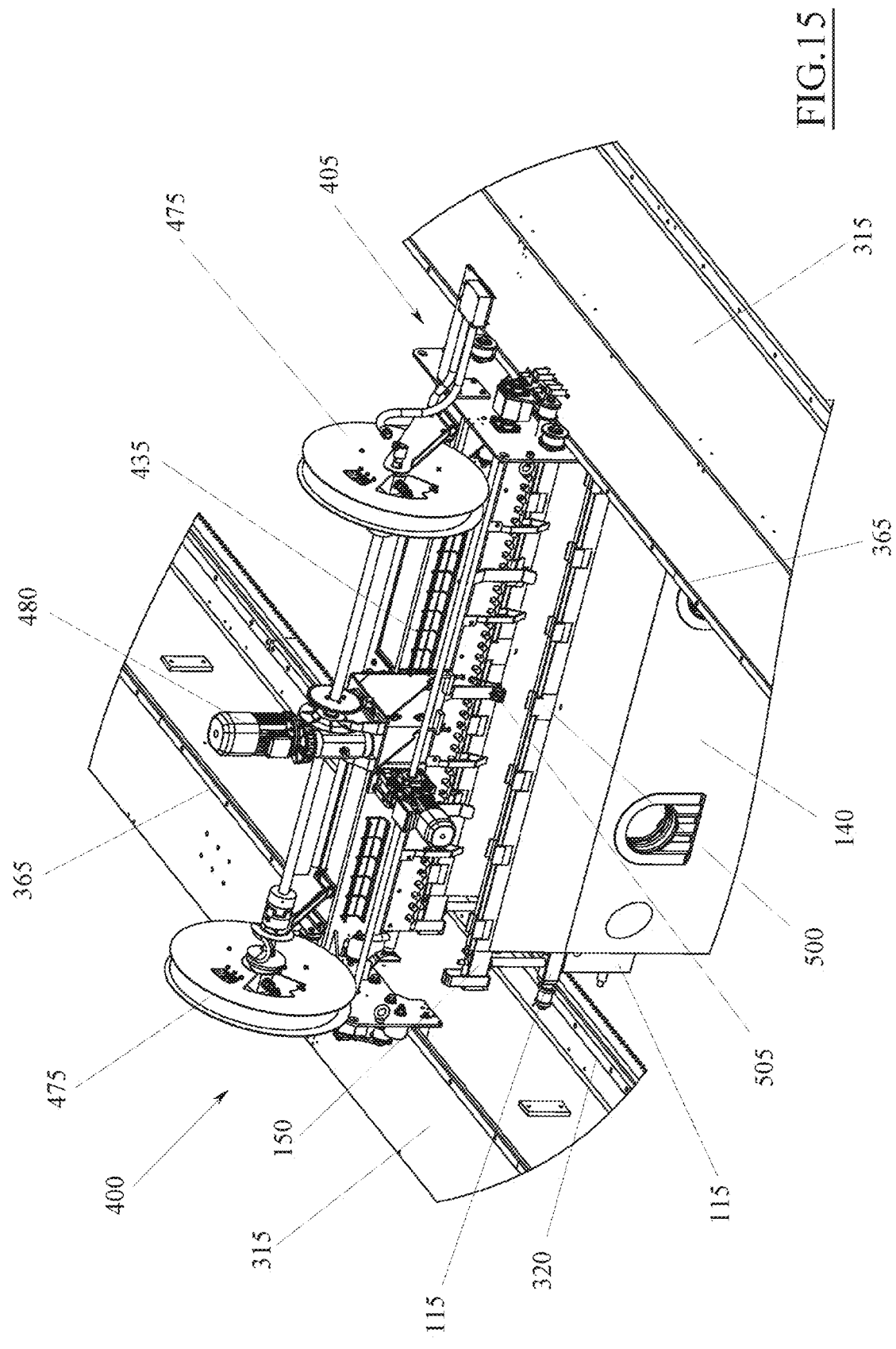
FIG. 15 is an axonometric view of a washing robot belonging to the filter press of FIG. 11 shown at a pair of consecutive containment plates and in an open configuration.

A support bar 115 is fixed to the upper flank of each containment plate 105, the ends of which are slidably supported on a guide rail 320 attached to a respective longitudinal member 315 (see also FIG. 15).

Being on board the respective support structure 300, the containment plates 105 of any embodiment are preferably interposed, in the direction of the longitudinal direction A, between a fixed head 325 and a movable head 330.

Each containment plate 105 thus comprises a front main face 120 facing the fixed head 325 and a rear main face 125 facing the movable head 330.

Both the front face 120 and the rear face 125 may comprise a recess 130 and a side frame 135 perimeterally delimiting said recess 130.

The movable head 330 can be moved towards and away from the fixed head 325, sliding in the longitudinal direction A.

This movement of the movable head 330 can be achieved by means of suitable movement systems, which may comprise, for example, one or more hydraulic jacks 335.

Moving towards the fixed head 325, the movable head 330 is able to close all of the containment plates 105 of the filter press 100 in a pack with one other and against the fixed head 325 itself.

Conversely, by moving away from the fixed head 325, the movable head 330 can leave sufficient space for each pair of consecutive containment plates 105 to move from a closed configuration (in which they are clamped as a pack), to an open configuration, in which said pair of containment plates 105 are mutually spaced apart.

In the embodiment of FIG. 11, the shift from the closed configuration to the open configuration can be achieved by means of a plurality of chains (not illustrated), one of which connects the movable head 330 to the first containment plate 105 closest to it, while each of the other chains connects a respective pair of mutually consecutive containment plates 105.

In this way, moving away from the fixed head 325, the movable head 330 initially separates from the first containment plate 105 until it stretches the first chain, after which the first containment plate 105 is forced to follow the movement of the movable head 330, moving away from the second containment plate until it stretches the next chain, and so on until all the pairs of containment plates 105 reach the open configuration.

In the embodiments of FIG. 1 and FIG. 5, the movement from the closed configuration to the open configuration can be achieved by means of a separating device (not illustrated), sliding in the longitudinal direction A, which is capable of engaging one containment plate 105 at a time, starting from the one closest to the movable head 330, and moving it away by a predetermined amount from the next containment plate 105.

Regardless of all these considerations, two filtering septa are associated with each containment plate 105, of which a first filtering septum 140 adapted to line its front face 120 and a second filtering septum 145 adapted to line its rear face 125.

In particular, each of these filtering septa 140 and 145 may be adapted to adhere to the perimeter frame 135 of the respective main face and to fully cover the recess 130 thereof, for example by assuming its shape and adhering to the bottom thereof.

In the example illustrated, each of the filtering septa 140 and 145 consists of a portion of filtering cloth.

However, it is not excluded that, in other embodiments, each of the filtering septa 140 and 145 may consist of a grid, mesh or perforated sheet, for example made of metal material.

This first and second filtering septum 140 and 145 can be fixed to the respective containment plates 105 in many different ways, without thereby departing from the scope of the present discussion.

For example, in the embodiment of FIGS. 2 and 6, the filtering septa 140 and 145 are partially wrapped around and fixed to the lateral flanks of the containment plate 105.

In the embodiment of FIG. 12, the filtering septa 140 and 145 are substantially suspended from a coupling bar 150, which is fixed to the upper lateral flank of the containment plate 105, where it lies substantially coplanar with the latter, for example in a position superimposed on the support bar 115.

In the illustrated embodiments, a first and a second separate and distinct filtering septum 140 and 145 are associated with each containment plate 105.

However, it is not excluded that, in other embodiments, the first and second filtering septa 140 and 145 may be joined together to form a single body.

In any case, the final result of this construction is that between each pair of consecutive containment plates 105 there always remain interposed two mutually facing filtering septa 140 and 145, of which the first is associated with the containment plate 105 closest to the movable head 330 while the second is associated with the containment plate 105 closest to the fixed head 325.

When these containment plates 105 are in a closed configuration, the first and second filtering septa 140 and 145 interposed therebetween are substantially in contact with each other at the perimeter frames 135 while they may be at least slightly spaced apart at the recesses 130.

Accordingly, a narrow, substantially closed filtration chamber 155 remains defined between these first and second filtering septa 140 and 145, as illustrated in the simplified diagram of FIG. 16, which is suitable for receiving the liquid to be filtered.

The liquid to be filtered may be fed into the filtration chambers 155 through one or more inlet ducts, each of which is made from a sequence of through holes which are obtained directly in the containment plates 105.

For example, in the embodiment of FIGS. 1 and 2 and the embodiment of FIGS. 5 and 6, the filter press 100 comprises a single inlet conduit, which is made by a sequence of through holes 160 individually made in a respective containment plate 105.

In practice, each containment plate 105 comprises a through hole 160 having an axis parallel to the longitudinal axis A and substantially coaxial to the corresponding through holes 160 of all other containment plates 105 of the filter press 100.

This through hole 160 can be made in the centre of the containment plate 105, for example at the bottom surface of the recesses 130.

In a coaxial position to this through hole 160, the first and second filtering septa 140 and 145 associated with the same containment plate 105 also have respective through holes 165.

Each containment plate 105 is further provided with two distribution rings arranged coaxially with the through hole 160, of which a first distribution ring 170 is fixed to the front face 120 of the containment plate 105, for example to the bottom surface of its recess 130, and a second distribution ring 175 is fixed to the rear face 125 of the same containment plate 105, for example to the bottom surface of its recess 130.

In this context, the through holes 165 of the first and second filtering septa 140 and 145 preferably have a smaller diameter than the outer diameter of the distribution rings 170 and 175, so that the first distribution ring 170 is also adapted to clamp the first filtering septum 140 against the front face 120 of the containment plate 105, while the second distribution ring 175 is also adapted to clamp the second filtering septum 145 against the rear face 125 of the containment plate 105.

When all the pairs of containment plates 105 are in a closed configuration, i.e., when all containment plates 105 are packed together, the first distribution ring 170 of each containment plate 105 may be frontally in contact with the second distribution ring 175 of an adjacent containment plate 105, making a section of pipe therewith that passes through the filtration chamber 155.

At the mutual contact zone, these first and second distribution rings 170 and 175 may, however, be shaped in such a way as to define lateral openings which place the section of pipe in hydraulic communication with the filtration chamber 155.

By means of the through holes 160 obtained in the containment plates 105, this section of pipe is then in hydraulic communication with the similar sections of pipe defined between all the other pairs of containment plates 105, thus forming overall the aforementioned inlet duct.

In the embodiment illustrated in FIGS. 11 and 12, the filter press 100 comprises two inlet ducts, each of which is made by a sequence of through holes 180 individually made in a respective containment plate 105.

In other words, each containment plate 105 comprises two through holes 180, each of which has an axis parallel to the longitudinal direction A and is coaxial with a corresponding through hole 180 of all the other containment plates 105.

The through holes 180 may be made at the perimeter frames 135 of the containment plate 105, outside of the recesses 130, for example near the upper flank of the containment plate 105 itself.

In a coaxial position with each of these through holes 180, the first and second filtering septa 140 and 145 associated with the containment plate 105 have a respective through hole 185.

For each through hole 180, the containment plate 105 is further provided with two distribution rings arranged coaxially with the respective through hole 180, a first distribution ring 190 being fixed to the front face 120 of the containment plate 105, for example embedded in a suitable seat obtained in its perimeter frame 135, and a second distribution ring 195 being fixed to the rear face 125 of the same containment plate 105, for example embedded in a suitable seat obtained in its perimeter frame 135.

Also in this case, the through holes 185 of the first and second filtering septa 140 and 145 preferably have a smaller diameter than the outer diameter of the distribution rings 190 and 195, so that the first distribution rings 190 are also adapted to clamp the first filtering septum 140 against the front face 120 of the containment plate 105, while the second distribution rings 195 are also adapted to clamp the second filtering septum 145 against the rear face 125 of the containment plate 105.

When all the pairs of containment plates 105 are in a closed configuration, i.e., when all the containment plates 105 are packed together, the first distribution rings 190 of each containment plate 105 may be frontally in contact with a respective second distribution ring 195 of an immediately adjacent containment plate 105, making a section of pipe therewith.

At the mutual contact zone, each first and second distribution ring 190 and 195 may be shaped in such a way as to define lateral openings which place the section of pipe defined thereby in hydraulic communication with the filtration chamber 155.

Each section of pipe defined by a first and a second distribution ring 190 and 195 is then in hydraulic communication with all the similar sections of pipe defined by the other pairs of containment plates 105, forming overall the aforementioned inlet ducts.

Regardless of the embodiment adopted, each inlet duct is then connected to an inlet hydraulic circuit adapted to supply it with the fluid to be filtered.

In the embodiment illustrated in FIG. 1, this inlet hydraulic circuit may comprise a first supply duct 340 engaging with the through hole 160 of the first containment plate 105 proximal to the fixed head 325, possibly a second supply duct 345 engaging (on the other side) with the through hole 160 of the last containment plate 105 proximal to the movable head 330, and a pump (not illustrated) that pumps the liquid to be filtered into the first supply duct 340 and the possible second supply duct 345.

In the embodiment of FIG. 5, the inlet hydraulic circuit may comprise a single supply duct 350 that engages with the through hole 160 of the first containment plate 105 proximal to the fixed head 325, and a pump (not shown) that pumps the liquid to be filtered into said supply duct 350.

In the embodiment of FIG. 11, the inlet hydraulic circuit may comprise a supply duct 355 which, by bifurcating, engages with the first distribution rings 190 of the containment plate 105 proximal to the fixed head 325, and a pump (not shown) which pumps the liquid to be filtered into this supply duct 355.

In all cases, the liquid to be filtered which reaches the filtration chambers 155 tends to cross the first and second filtering septa 140 and 145 which delimit each of them, while the solid part remains inside forming a relatively compact deposit.

After passing through the filtering septa 140 and 145, the filtered liquid flows into one or more collection ducts, each of which may be made from a sequence of through holes 200 which are obtained directly in the containment plates 105, similarly to the previously described inlet ducts.

In practice, each containment plate 105 comprises one or more through holes 200, each of which has an axis parallel to the longitudinal direction A and is coaxial with a corresponding through hole 200 of all other containment plates 105.

Each of these through holes 200 may be made at the perimeter frames 135 of the respective containment plate 105, externally to the recesses 130.

In the embodiments of FIGS. 2 and 6, each containment plate 105 comprises, for example, four through holes 200 positioned at the edges of the containment plate 105 itself. In a coaxial position with each through hole 200, the first and second filtering septa 140 and 145 associated with the containment plate 105 also have a respective through hole 205.

In the embodiment of FIG. 12, each containment plate 105 includes six through holes 200, of which a first pair of through holes 200 is positioned at the top flank of the containment plate 105, a second pair of through holes 200 is obtained in an appendage of the containment plate 105 that projects from the right lateral flank, and a third pair of through holes 200 is obtained in an appendage that projects from the left lateral flank. In coaxial position with each through hole 200 of the first pair, the first and second filtering septa 140 and 145 have a respective through hole 205, while the through holes 200 of the second and third pairs remain entirely uncovered.

Regardless of the specific embodiment, when all the pairs of containment plates 105 are in a closed configuration, i.e., when all the containment plates 105 are packed together, each through hole 200 of a containment plate 105 is in hydraulic communication with a succession of homologous through holes 200 of all the other containment plates 105, forming overall one of the aforementioned collection ducts.

Each through hole 200 is also in communication, for example through a suitable system of channels obtained in the body of the containment plate 105, with a narrow cavity that remains defined between the front face 120 of the containment plate 105 and the first filtering septum 140, for example between the latter and the bottom surface of the recess 130 made in said front face 120, and/or with a narrow cavity that remains defined between the rear face 125 of the containment plate 105 and the second filtering septum 145, for example between the latter and the bottom surface of the recess 130 made in said rear face 125.

In this way, the filtered liquid passing through the filtering septa 140 and 145 first flows into said cavities and then, through internal channels, reaches the through holes 200 and then the collection ducts.

These collection ducts are in turn connected, preferably at the fixed head 325, to a hydraulic outlet circuit adapted to discharge the filtered fluid, conveying it, for example, to a storage tank, a disposal system or to other uses.

The hydraulic outlet circuit may comprise, for example, a plurality of conveying ducts 360 which individually engage with a respective through hole 200 of the first containment plate 105 proximal to the fixed head 325, and which may then converge into a single discharge pipe.

It is specified herein that the supply of the fluid to be filtered inside the filtration chambers 155 and the consequent extraction of the filtered liquid does not take place continuously, but is interrupted after a certain period of time, when the filtration chambers 155 are substantially full of solid residue which forms the aforementioned compact deposit.

At this point, each pair of consecutive containment plates 105 is brought into an open configuration, as outlined above.

In this way, the first and second filtering septa 140 and 145 which are interposed between said pair of containment plates 105 separate in the longitudinal direction A, laterally opening the filtration chamber 155 and thus allowing the compact deposit to fall downwards outside the filter press 100.

This compact deposit can then be collected, for example, in special compartments provided underneath the containment plates 105, for disposal or further treatment.

However, in prolonged use, some of the solid material separated from the filtered liquid may remain attached to the filtering septa 140 and 145, soiling them and reducing their efficiency.

For this reason, the filter press 100 generally comprises a washing robot, indicated overall with 400, which is in charge of washing the filtering septa 140 and 145 located between each pair of consecutive containment plates 105, for example after each filtration cycle or after a certain number of filtration cycles.

This washing robot 400 may comprise a trolley 405, which is movable with respect to the containment plates 105 along the longitudinal direction A.

In particular, the trolley 405 can be slidably coupled to the support structure 300 and can be shaped so as to be able to move at the containment plates 105 (which remain stationary), without interfering with them.

For example, in the embodiment illustrated in FIG. 1, the trolley 405 may have a gantry structure lying in a plane transverse to the longitudinal direction A and delimiting a passageway facing and aligned with the succession of containment plates 105.

In particular, the trolley 405 may comprise two vertical uprights 410 positioned on opposite sides with respect to the containment plates 105, and an upper crossbar 415 which, by joining the two vertical uprights 410, overlies the containment plates 105.

The base of each vertical upright 410 may be slidably coupled to a respective guide rail 365 extending parallel to the longitudinal direction A.

The sliding of the trolley 405 on the support structure can be delegated to any known drive device, for example electromechanical or electro-hydraulic.

In the embodiment illustrated in FIG. 5, the trolley 405 of the washing robot 400, although having a different shape and design, retains the same gantry structure outlined above.

In this case, however, the trolley 405 is slidably coupled to the support structure 300 by means of the upper cross member 415, which is supported and slides along the longitudinal member 310 extending parallel to the longitudinal direction A overlying the containment plates 105.

The sliding of the trolley 405 can be delegated to an electromechanical system comprising a rectilinear rack 370 fixed to the longitudinal member 310, and at least one pinion (not visible) installed on the upper crossbar 415 which, driven by an electric motor, rotates in engagement with the rectilinear rack 370.

The sliding of the trolley 405 on the support structure 300 could, however, be delegated to any other known driving device, for example electromechanical or electro-hydraulic. In the embodiment illustrated in FIG. 11, the trolley 405 of the washing robot 400 no longer comprises the gantry structure outlined above, but may simply comprise an upper crossbar 435 which, extending transversely with respect to the longitudinal direction A, surmounts the containment plates 105 (see FIG. 15).

The opposite ends of this upper crossbar 435 may be slidably coupled to two guide rails 365 which extend parallel to the longitudinal direction A and which may be individually fixed to a respective longitudinal member 315.

The sliding of the trolley 405 on the support structure 300 can be delegated to any known driving device, for example electromechanical or electro-hydraulic.

Any type of washing robot 400 may further comprise a bar 445, which is installed on board the trolley 405 and is movable with respect to the latter in a transverse direction (e.g. orthogonal) to the longitudinal direction A, so as to be able to move in the space comprised between any pair of consecutive containment plates 105, when the latter are in an open configuration.

In particular, the bar 445 may be straight, preferably horizontal and oriented orthogonally to the longitudinal direction A, and may be provided, with respect to the trolley 405 on which it is installed, with a translation movement in a vertical direction between an upper and a lower end position.

In the upper end position, the bar 445 may be placed at a higher level than the containment plates 105, while in the lower end position, it may be placed at substantially the same level as their lower flank or below.

A plurality of nozzles 450 may be associated with the bar 445, each of which is capable of delivering a jet of a washing liquid, typically water, towards the first and/or second filtering septum 140 and 145 covering respectively the front face 120 of one and the rear face 125 of the other containment plate 105 of the pair.

For example, the bar 445 may be provided with a first array of nozzles 450, arranged for example in a row along the longitudinal extension thereof, which are directed towards the fixed head 325, and/or a second array of nozzles 450, arranged for example in a row along the longitudinal extension thereof, which are directed towards the movable head 330.

In order to dispense the jets of washing liquid, the nozzles 450 may be connected to a suitable hydraulic washing liquid supply system, which may generally comprise a pump, preferably a high pressure pump, which is adapted to take the washing liquid from a tank or a supply network and to send it under pressure to the nozzles 450 from which it flows. In particular, this hydraulic supply system may comprise at least one manifold 455, which is attached to and/or forms an integral part of the bar 445.

This manifold 455 is shaped like a hollow body, for example a tube, which preferably has a straight extension and is oriented parallel to the bar 445.

The nozzles 450 can be directly inserted into respective through holes in the side wall of the aforementioned manifold 455 or be directly defined by the latter.

Figure 4:
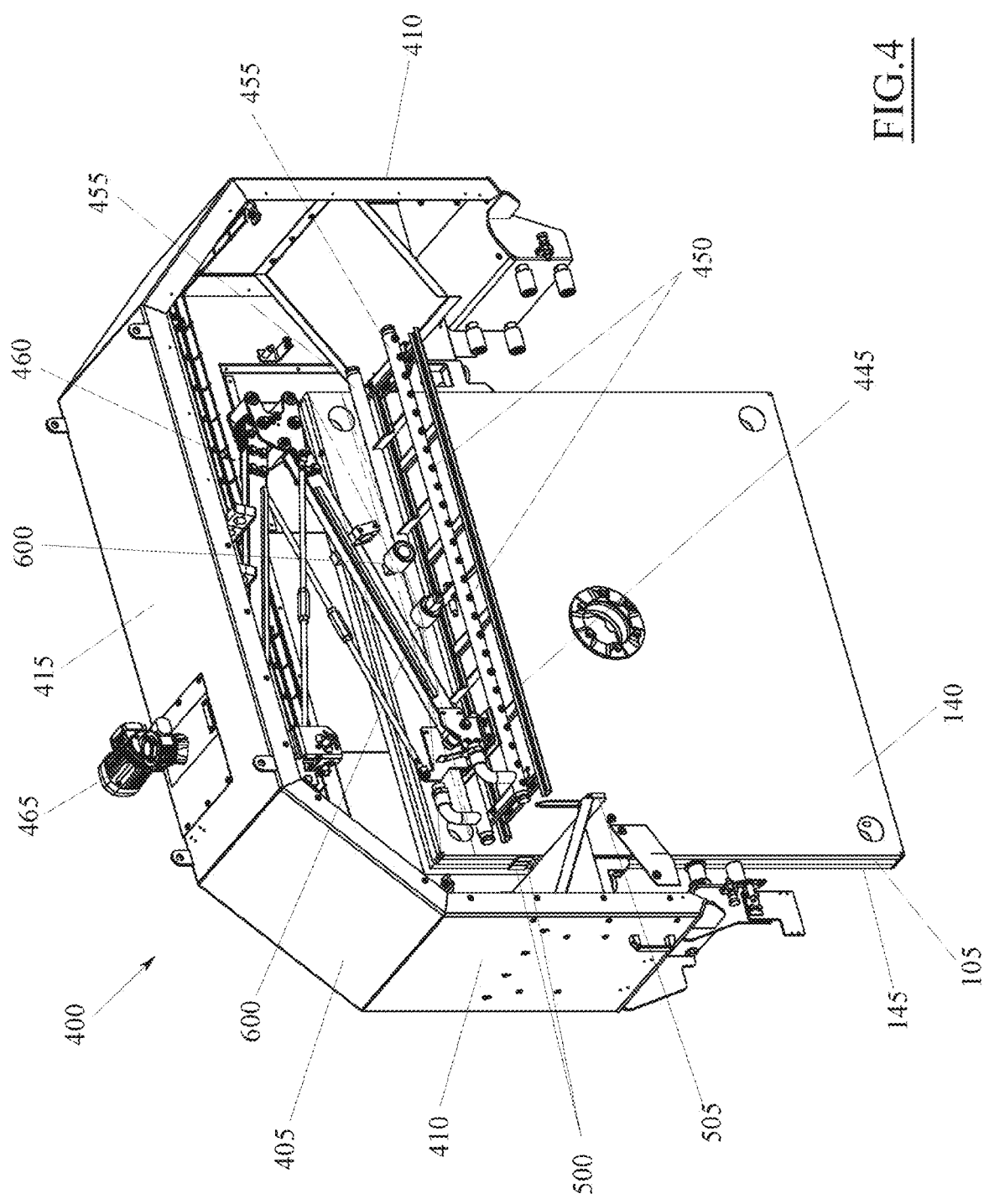
FIG. 4 is the view of FIG. 3 in which one of the containment plates has been hidden to better illustrate some of the details of the invention.

In the embodiment illustrated in FIG. 4, the bar 445 comprises two parallel manifolds 455 preferably lying in the same horizontal plane, one of which carries nozzles 450 facing the fixed head 325, while the other carries nozzles 450 facing the movable head 330.

The bar 445 is shaped like a kind of frame that carries both of the above-mentioned 455 manifolds.

The movement of the bar 445 on board the trolley 405 is driven by means of an articulated arm kinematic mechanism 460 (e.g. pantograph) which connects the bar 445 to the crossbar 415 of the trolley 405 and which can be operated by an electric motor 465.

Figure 8:
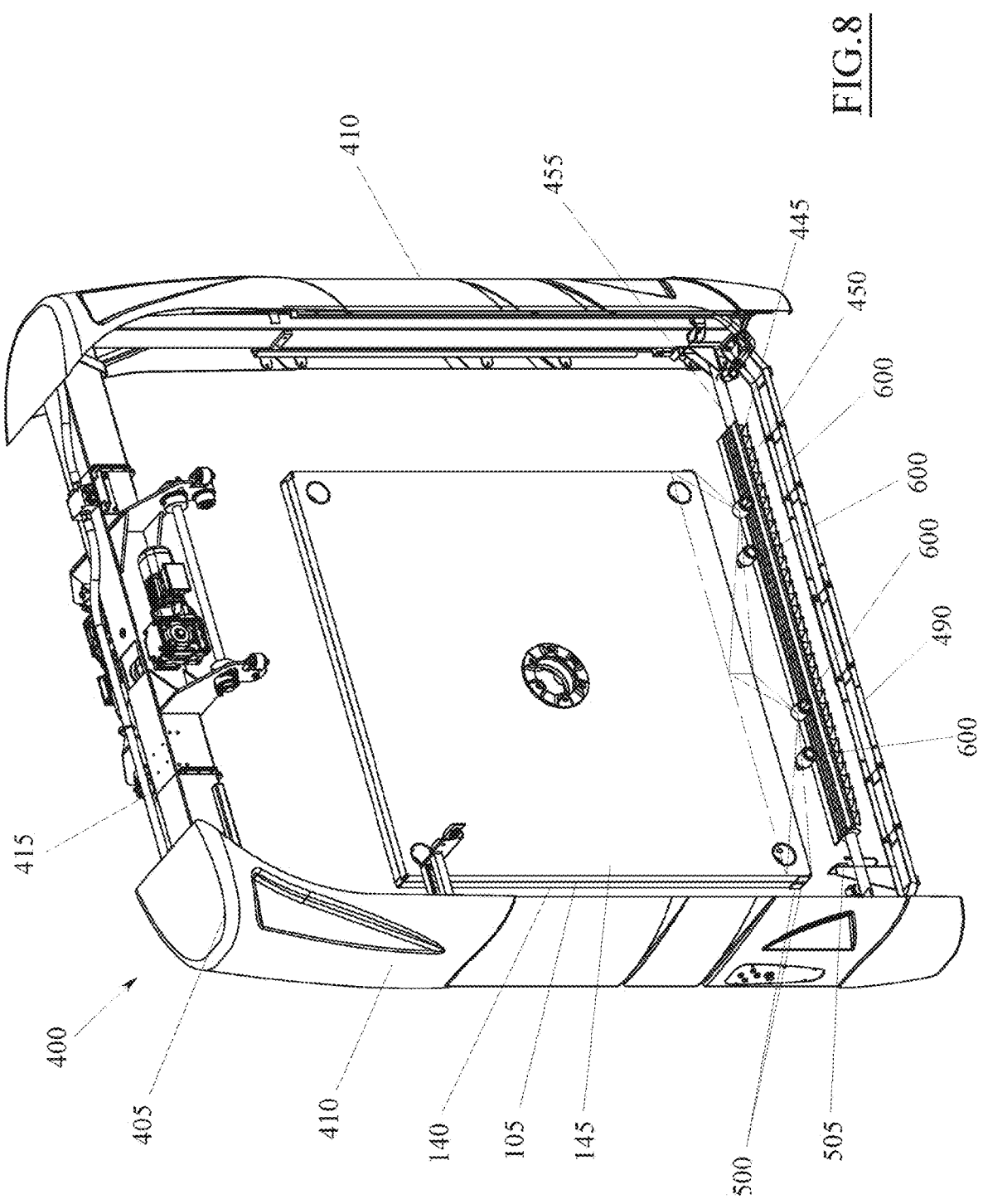
FIG. 8 is the view of FIG. 7 in which one of the containment plates has been hidden to better illustrate some of the details of the invention.

In the embodiment illustrated in FIG. 8, the bar 445 comprises and is substantially defined by a single manifold 455, with which both the nozzles 450 facing the fixed head 325 and the nozzles 450 facing the movable head 330 are associated.

The movement of the bar 445 on board the trolley 405 can be operated by any driving system, e.g. electromechanical or electro-hydraulic.

Figure 14:
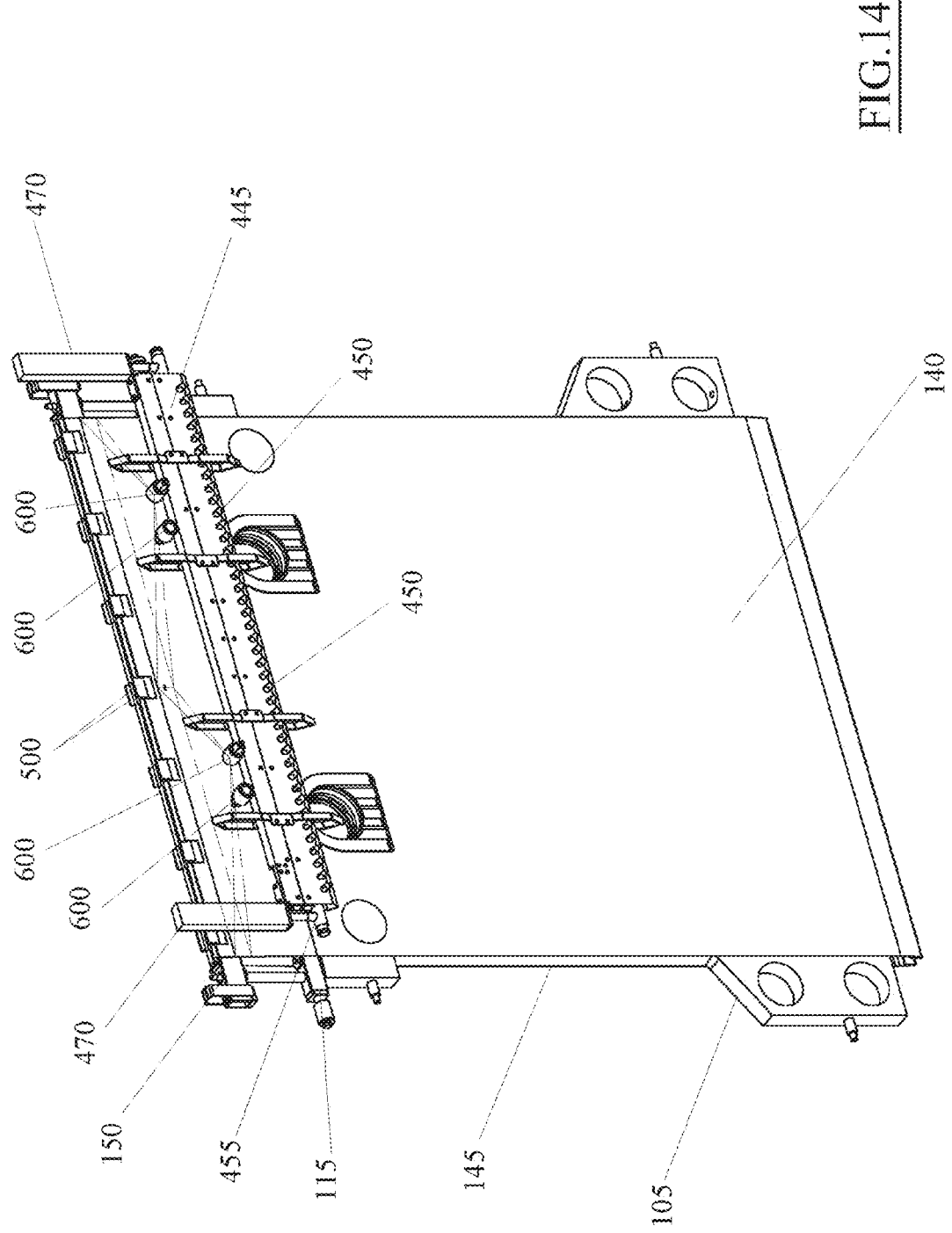
FIG. 14 is the view of FIG. 13 in which one of the containment plates has been hidden to better illustrate some of the details of the invention.

Also in the embodiment of FIG. 14, the bar 445 comprises and is substantially defined by a single manifold 455, with which both the nozzles 450 facing the fixed head 325 and the nozzles 450 facing the movable head 330 are associated.

In this case, the movement of the bar 445 on board the trolley 405 is driven by means of a pair of vertically oriented chains (or belts) 470, each of which has a lower end attached to a respective end of the bar 445 and an upper end attached to a collection reel 475 (see FIG. 15) pivotally installed on the trolley 405, in particular on the crossbar 415 overlying the containment plates 105.

The collection reels 475 have horizontal axes of rotation and are driven simultaneously and in the same direction, for example by a single electric motor 480, so that the unwinding and winding of the respective belts 470 cause the bar 445 to descend and ascend, respectively.

The operation of the washing robot 400 provides for the trolley 405 to slide on the support structure 300 along the longitudinal direction A and to be stopped, one after the other, at all the consecutive pairs of containment plates 105 that are in an open configuration.

During the sliding of the trolley 405, the bar 445 is kept in the upper end position so as not to interfere with the containment plates 105.

When the trolley 405 is stopped, the bar 445 is then vertically aligned with the space comprised between a pair of consecutive containment plates 105 and in an open configuration.

Consequently, the bar 445 can be operated to move with respect to the trolley 405 (which remains stationary) in a vertical direction from the upper end position to the lower end position and back again.

During one or both of these strokes, the washing fluid supply hydraulic system may be operated so that the nozzles 450 installed on the bar 445 deliver jets of washing fluid (preferably at high pressure) onto the filtering septa 140 and 145 lining the containment plates 105, washing them and removing any solid deposits that may have remained attached.

However, following the repetition of the filtration cycles, the filtering septa 140 and 145 which are associated with the containment plates 105 are in any case subject to progressive wear and/or may be damaged by accidental events, thus requiring replacement. In order to monitor the state of integrity and wear of the filtering septa 140 and 145, it is envisaged that the filter press 100 is equipped with an electronic processing unit (not illustrated) which governs and manages a system for the recognition of the filtering septa 140 and 145, as well as a system for screening them.

The recognition system requires that each filtering septum 140 and 145 installed in the filter press 100 is provided with a unique identification code.

In particular, this unique identification code can be incorporated into an RFID 500 tag. Each RFID tag generally comprises an antenna capable of emitting a radio signal encoded with its unique identification code.

Each RFID tag 500 may also comprise a (small) local memory unit, preferably of the readable and rewritable/reprogrammable type, in which further information of the respective filtering septum 140 or 145 may be stored.

This information may include, for example, the make and model of the filtering cloth, the position within the sequence of containment plates 105 (i.e., its "distance" from the fixed head 325 and/or the movable head 330), and the number of filtration cycles performed. This information can also be encoded in the radio signal emitted by the antenna of the respective RFID tag 500.

The recognition system may therefore comprise a detection device adapted to read/detect the unique identification code that is attached to each filtering septum 140 and 145. This detection device can be connected to the electronic processing unit via any known connection system, either wired or wireless.

Preferably, the detection device is installed on board the trolley 405 of the washing robot 400, so as to be adapted to read the identification codes of the filtering septa 140 and 145, when the latter are subjected to a washing operation as outlined above.

The detection device may comprise, for example, an antenna 505 adapted to pick up the radio signal that is emitted by each RFID tag 500 and in which the unique identification code and possibly the information stored in its local memory unit are encoded.

Possibly, the antenna 505 may also be adapted to transmit to each RFID tag 500 a radio signal allowing it to write/rewrite its local memory unit, for example in order to periodically update the number of filtration cycles that have been performed by the respective filtering septum 140 or 145.

In any case, it is preferable that the antenna 505 is configured to receive and/or exchange radio signals with each RFID tag 500, only when it is at a relatively small distance from the latter, for example less than the distance separating a pair of consecutive containment plates 105 in an open configuration.

This effect can be achieved, for example, by appropriately decreasing the power of the antenna 505.

In this way, during the movement of the trolley 405, the antenna 505 may advantageously be able to pick up the signals of a small number of RFID tags 500 at a time, preferably only one RFID tag 500 at a time, thus allowing the identification system to "isolate" the picked up signals and thus to assign to the corresponding filtering septa 140 or 145 their correct position.

In order to make the identification system compatible with both European and American standards, RFID 500 tags can be configured to emit and possibly receive radio signals at frequencies from 860 MHz to 960 MHz.

Correspondingly, the antenna 505 of the detection device may be configured to operate at frequencies comprised between 865 MHz and 868 MHz in the European area, or to operate at frequencies comprised between 902 MHz and 928 MHz in the American area.

The detection device may further comprise a reader (not shown), which is connected to the antenna 505 and is adapted to decode the radio signals from the RFID tags 500, acquiring their unique identification codes and any additional information.

The reader may also be able to prepare the information to be transmitted and written to the local memory units of the RFID 500 tags.

This reader can be connected with the antenna 505 via any cable connection system, and will then in turn be connected with the processing unit, either wired or wireless.

Alternatively, it will be possible to adopt integrated systems in which the antenna 505 and the reader are integrated in a single device.

Preferably, both the antenna 505 and the reader are installed on board the trolley 405 of the washing robot 400.

However, it is not excluded that, in other embodiments, only the antenna 505 is installed on the trolley 405 of the washing robot 400, the reader being able to be installed in any other fixed position on the support structure 300 of the filter press 100.

Figure 3:
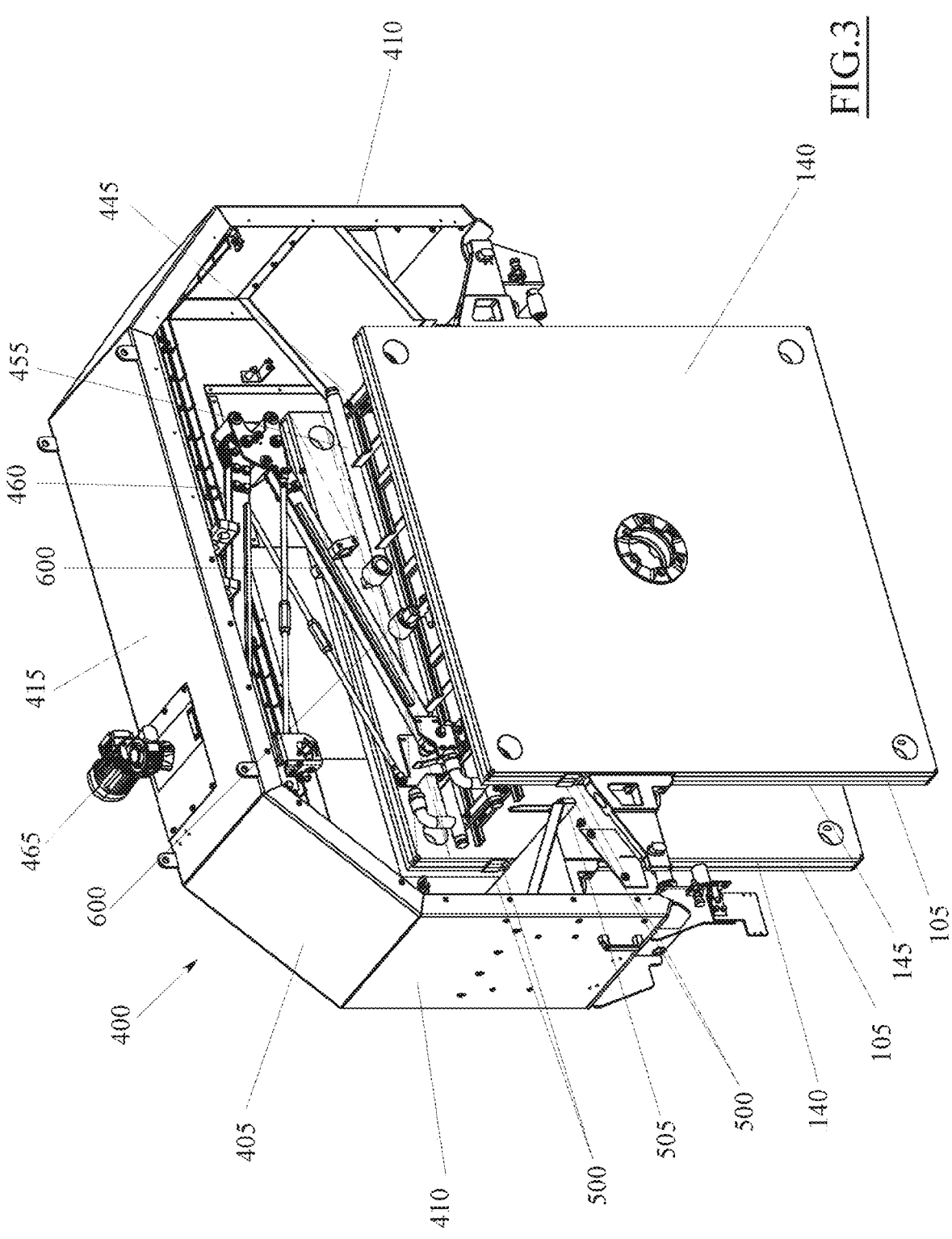
FIG. 3 is an axonometric view of a washing robot belonging to the filter press of FIG. 1 shown at a pair of consecutive containment plates and in an open configuration.

In the embodiment illustrated in FIGS. 3 and 4, the first and second filtering septa 140 and 145, which are associated with each containment plate 105, may bear respective RFID tags 500 at a lateral flank of the containment plate 105 itself, preferably at a position closer to the upper flank than to the lower flank, for example above the bracket 110.

The antenna 505 of the detection device may be fixed to the upright 410 of the trolley 405 that is proximal to said lateral flank of the containment plate 105, for example carried by a connection bracket, at substantially the same level and so as to pass in proximity to the RFID tags 500 (without touching them).

The reader can be positioned on the trolley 405 at a higher level than the antenna 505, for example but not necessarily at the crossbar 415.

Figure 7:
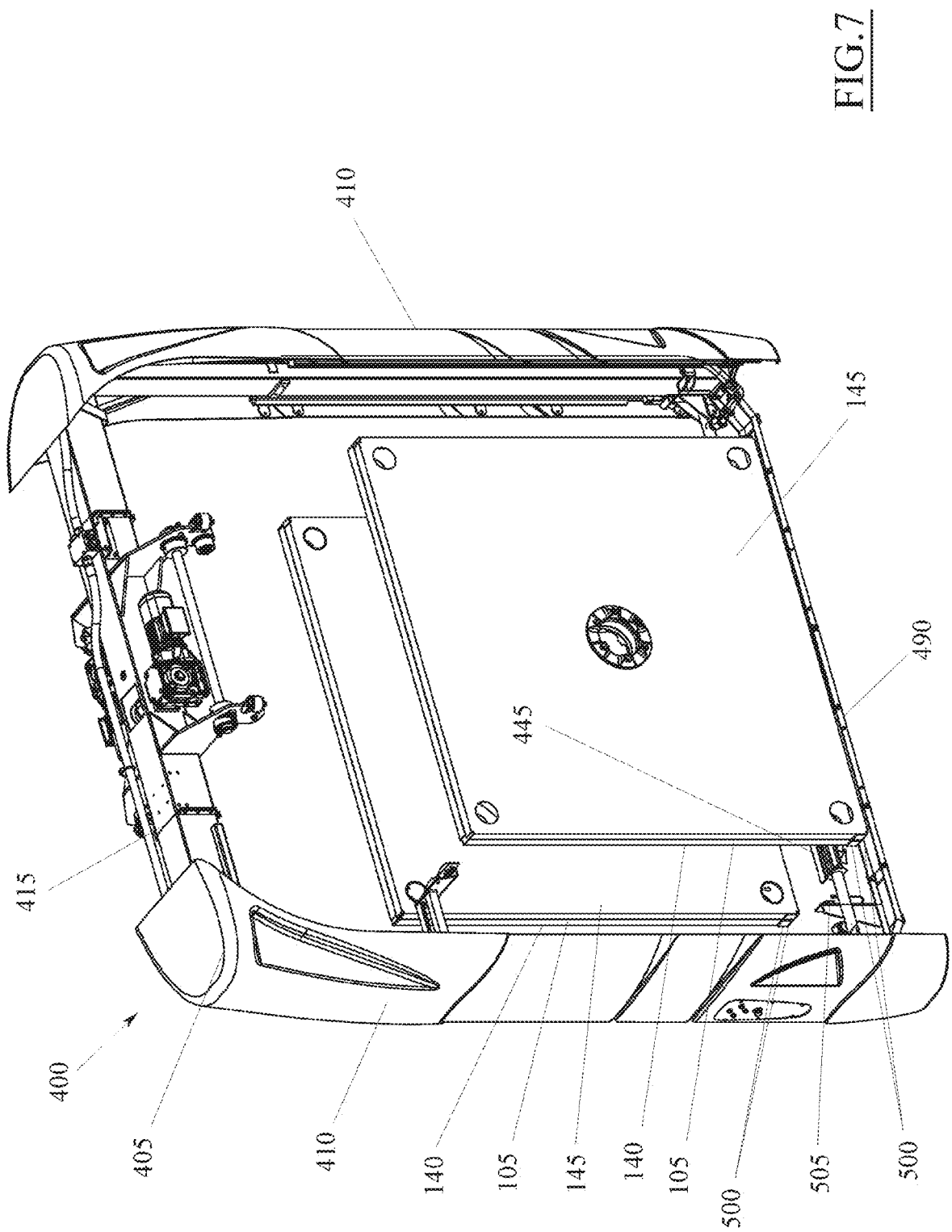
FIG. 7 is an axonometric view of a washing robot belonging to the filter press of FIG. 5 shown at a pair of consecutive containment plates and in an open configuration.

In the embodiment illustrated in FIGS. 7 and 8, the first and second filtering septa 140 and 145, which are associated with each containment plate 105, may bear respective RFID tags 500 at a lateral flank of the containment plate 105 itself, preferably at a position closer to the lateral flank than to the upper flank, for example at the edge that separates said lateral flank from the lower flank.

The antenna 505 of the detection device may be fixed in the lower part of the trolley 405, in proximity to the upright 410 of the trolley 405 facing the aforementioned lateral flank of the containment plate 105, for example fixed to the top of a bracket derived from a bar 490 adapted to connect the two uprights 410 while standing below the containment plates 105.

In particular, said support bracket brings the antenna 505 to substantially the same level as the RFID tags 500, so that the antenna 505 passes close to the latter without touching them.

Again, the reader can be positioned on the trolley 405 at a higher level than the antenna 505, for example but not necessarily at the crossbar 415.

In the embodiment illustrated in FIG. 15, the first and second filtering septa 140 and 145, which are associated with each containment plate 105, may bear respective RFID tags 500 at an upper edge thereof that protrudes above the upper flank of the containment plate 105 itself, for example at a central position along said upper edge.

The antenna 505 of the detection device may be fixed to the crossbar 435 of the trolley 405, at a position where said antenna 505 and the RFID tags 500 associated with the filtering septa 140 and 145 lie substantially in the same vertical plane parallel to the longitudinal direction A.

For example, the antenna 505 may be carried on the lower end of a support bracket fixed to the crossbar 435 of the trolley 405 and extending downwards, so that the antenna 505 can pass close to the RFID tags 500 without touching them.

Again, the reader can be placed on the trolley 405 at a higher level than the antenna 505, for example on the crossbar 435.

In some embodiments, it is contemplated that the filter press 100 may also include a containment plate 105 detection system.

This system is similar to the preceding system and provides for each containment plate 105 to have a respective unique identification code, which may for example be incorporated into an RFID tag (not shown) which may have the same characteristics as outlined in relation to the RFID tags 500 associated with the filtering septa 140 and 145.

The RFID tag may store information such as the make and model of the containment plate 105, the position within the sequence of containment plates 105 (i.e., its "distance" from the fixed head 325 and/or the movable head 330), and the number of filtration cycles performed.

The unique identification codes attached to the containment plates 105 may be detected by a corresponding detection device, which is preferably installed on board the trolley 405 and may have the same characteristics as illustrated for the device for detecting the identification codes of the filtering septa 140 and 145.

In particular, the unique identification codes fixed to the containment plates 105 can be detected with a dedicated detection device or possibly with the same detection device used for the codes associated with the filtering septa 140 and 145. Turning now to the screening system, it comprises at least one image acquisition device 600, which is installed on the bar 445 of the washing robot 400, for example at a higher level than the nozzles 450 that dispense the jets of washing liquid.

This acquisition device 600 can be connected to the central processing unit via any connection system, either wired or wireless.

The acquisition device 600 may for example be a camera, video camera or any other device adapted to acquire static images and/or video of the filtering septa 140 and 145. In this way, by means of a movement of the bar 445 between a pair of consecutive containment plates 105 and in an open configuration, the acquisition device 600 is able to acquire one or more images of the first and/or second filtering septum 140 and 145 that are interposed between said containment plates 105.

These images can possibly be processed and combined by the electronic processing unit, so as to obtain a complete image of each filtering septum 140 and 145, in practice obtaining a true scan of them.

In order to perform this scan on both filtering septa 140 and 145, the acquisition device 600 can be movably mounted on the bar 445, so that it can change its orientation towards the fixed head 325 and alternatively towards the movable head 330.

More preferably, however, the screening system comprises at least two acquisition devices 600, wherein a first acquisition device 600 faces the fixed head 325 and a second acquisition device 600 faces the movable head 330.

In this way, with a single movement of the bar 445 it is advantageously possible to scan both filtering septa 140 and 145 simultaneously.

This solution is adopted, for example, in the embodiment shown in FIGS. 3 and 4.

The use of only one acquisition device 600, or only one acquisition device 600 per side may however result in the need for its field of view to be sufficiently wide to frame a complete strip of the filtering septa 140 and 145, i.e. a strip extending continuously from one lateral flank of the containment plate 105 to the opposite lateral flank.

For this to be possible, the distance between the acquisition device 600 and the filtering septum 140 or 145 to be scanned must be sufficiently large.

However, the space available between each pair of consecutive containment plates 105 in an open configuration may sometimes be very narrow, so that the field of view of an acquisition device 600, installed on the bar 445 passing through them, may not be large enough to guarantee the envisaged condition.

To overcome this drawback, the screening system could therefore comprise a group of acquisition devices 600, arranged in a row and mutually spaced along the longitudinal extension of the bar 445 of the washing robot 400, all of which can be oriented towards the fixed head 325 or towards the movable head 330.

More preferably, the screening system could comprise two of said groups of acquisition devices 600, wherein the acquisition devices 600 of one of said groups are all oriented towards the fixed head 325, while the acquisition devices 600 of the other group are all oriented towards the movable head 330.

Figure 13:
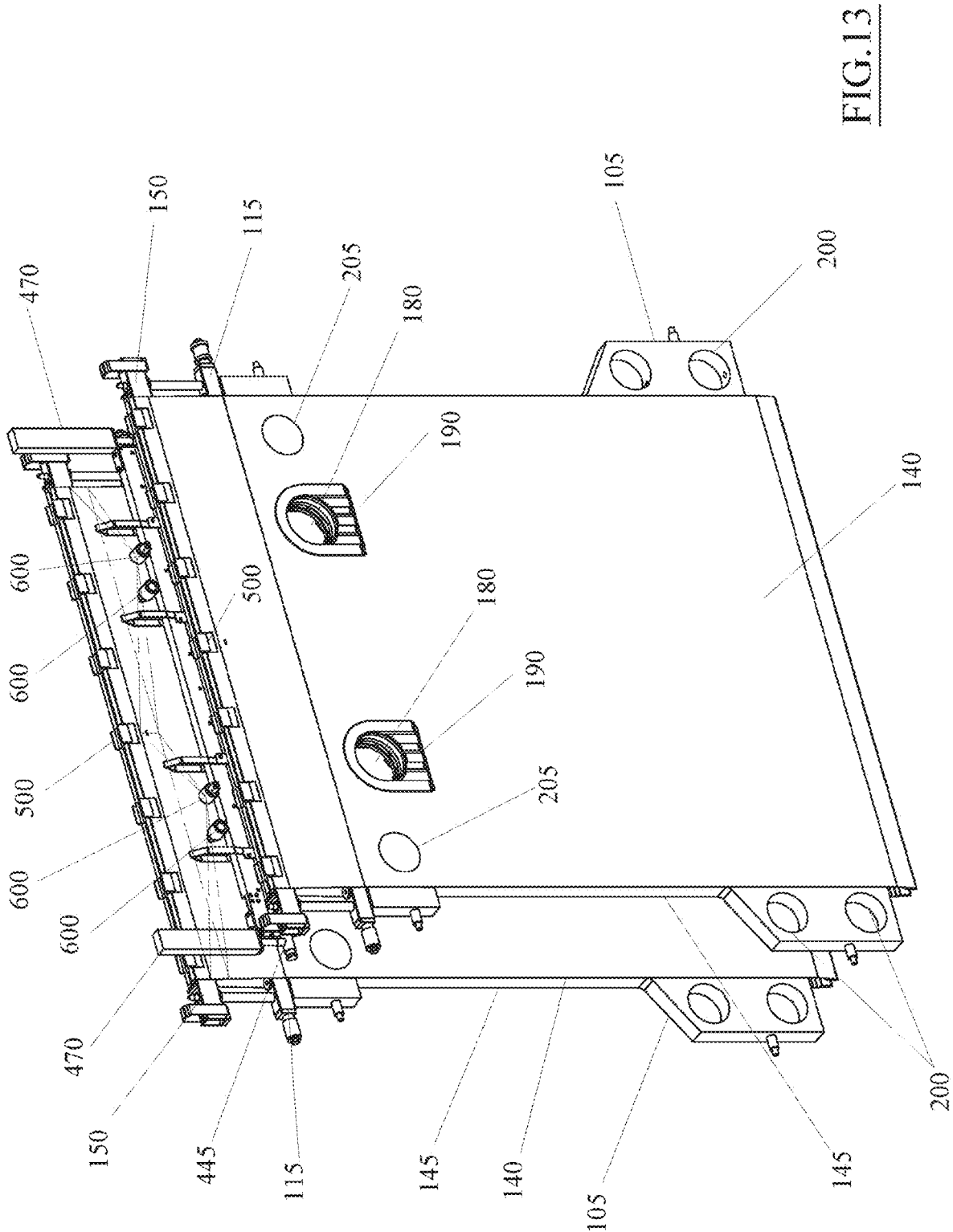
FIG. 13 is an axonometric view of a pair of consecutive containment plates in an open configuration.

In this way, the images taken by the acquisition devices 600 of each group can be combined to obtain an image of a complete strip of the filtering septum 140 and 145. This solution is adopted, for example, in the embodiment illustrated in FIG. 8 and in the embodiment illustrated in FIGS. 13 and 14, whereby two acquisition devices 600 facing the fixed head 325 and two further acquisition devices 600 facing the movable head 330 are installed on the bar 445 of the washing robot 400.

Another possibility to increase the field of view of each acquisition device 600 is to position the trolley 405 of the washing robot 400 in such a way that the bar 445 is not perfectly equidistant from the two containment plates 105.

For example, when scanning the first filtering septum 140, it is possible to place the trolley 405 in such a way that the bar 445 and, consequently, the acquisition devices 600, are closer to the second filtering septum 145.

Conversely, when scanning the second filtering septum 145, it is possible to place the trolley 405 in such a way that the bar 445 and, consequently, the acquisition devices 600, are closer to the first filtering septum 140.

Another possibility to increase the field of view of each acquisition device 600 could be to equip it with a translatory movement, on board the bar 445, in a horizontal direction and orthogonal to the longitudinal direction A.

In order to improve image acquisition, the screening system of any embodiment may further comprise one or more lamps adapted to illuminate the filtering septa 140 and 145, which may also be installed on the trolley 405 and/or on the bar 445 of the washing robot 400.

Figures 9, 10:
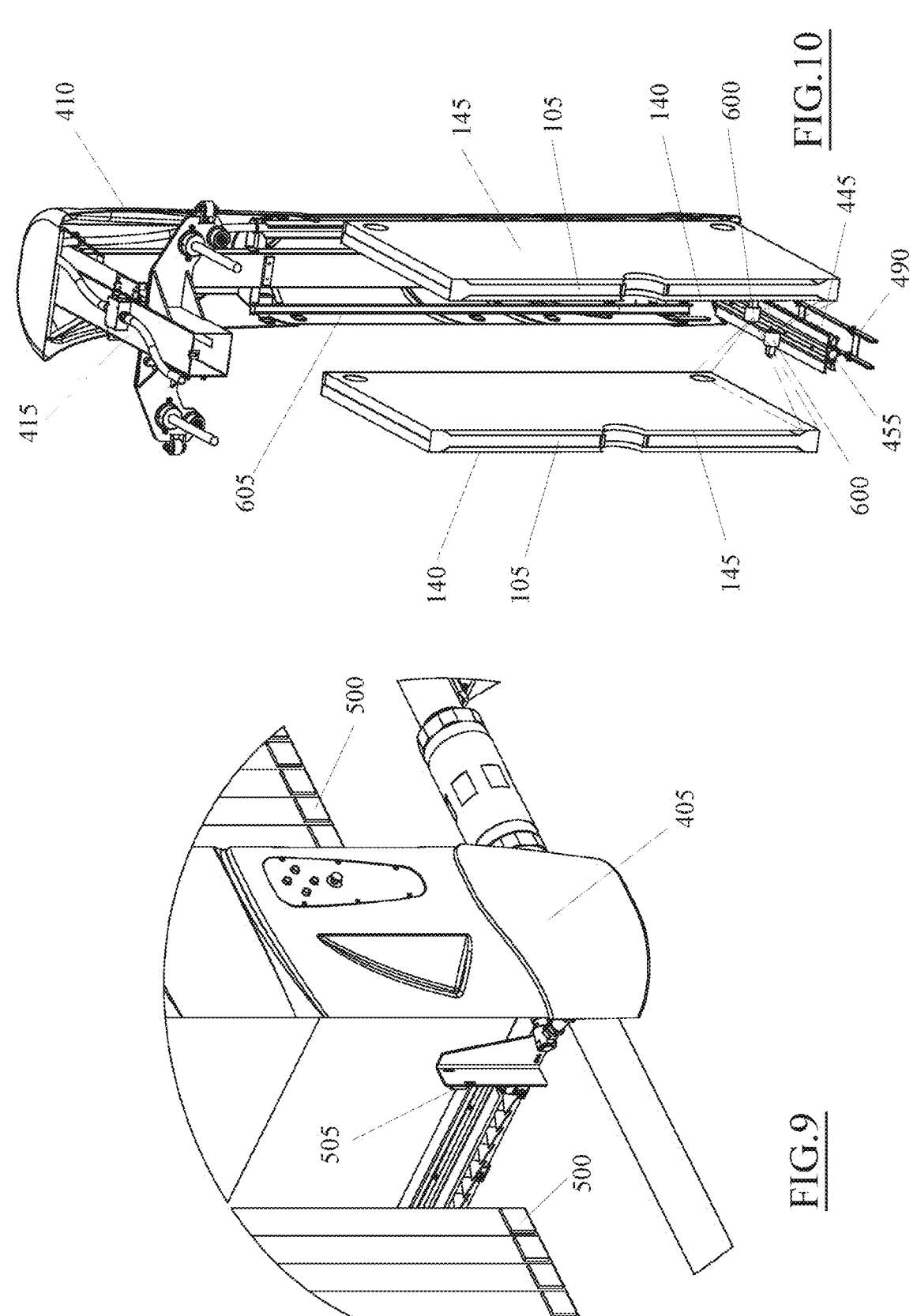
FIG. 9 is an enlarged detail of FIG. 5 at the washing robot.
FIG. 10 shows a section of the assembly of FIG. 7.

For example, the embodiment illustrated in FIG. 10 includes a lamp 605 installed in parallel on each upright 410 of the trolley 405, and possibly a further lamp (not illustrated) installed in parallel on the bar 445, for example below the manifold 455 carrying the nozzles 450.

In view of the foregoing, the operation of the recognition and screening system provides that the trolley 405 slides on the support structure 300 along the longitudinal direction A and is stopped sequentially at all consecutive pairs of containment plates A that are in an open configuration.

During the sliding of the trolley 405, the bar 445 is kept in the upper end position so as not to interfere with the containment plates 105.

When the trolley 405 is stopped or when it passes by, the antenna 505 of the recognition system picks up the radio signals emitted by the RFID tags 500 associated with the first and second filtering septa 140 and 145 that are interposed between said pair of containment plates 105, acquiring their unique identification codes.

If necessary, the antenna 505 of the recognition device can also detect the radio signals emitted by the RFID tags attached to the containment plates 105 between which the filtering septa 140 and 145 are interposed, also acquiring in this case their unique identification codes.

These unique identification codes can be transmitted to the electronic processing unit which can then identify the two filtering septa 140 and 145 and possibly the containment plates 105.

In this way, the electronic processing unit can firstly keep track of each filtering septum 140 and 145 and/or each containment plate 105, for example to find out/monitor its position within the filter press 100 and/or the number of filtration cycles performed.

At the same time or subsequently, the bar 445 may be operated to move with respect to the trolley 405 (which remains stationary) in a vertical direction from the upper end position to the lower end position and back, if necessary repeating this movement one or more times.

During at least one of these strokes, the acquisition device(s) 600 may scan the first and second filtering septa 140 and 145 and acquire images thereof.

These images can be transmitted to the electronic processing unit, which can associate them with the respective unique identification codes or the respective filtering septa 140 or 145.

As can be easily understood, these operations can preferably be carried out at the same time as the washing operations.

For example, after stopping the trolley 405 of the washing robot 400 at a pair of consecutive containment plates 105 and in an open configuration, the bar 445 may perform one or more strokes in which the nozzles 450 are operated, followed by one or more strokes in which the acquisition devices 600 are operated.

However, it is not excluded that, in other embodiment, screening and washing may be carried out independently of each other.

In any case, screening operations are preferably carried out, one after the other, for all consecutive pairs of containment plates 105 of the filter press.

The images of each filtering septum 140 and 145 may be used by the computer processing unit to verify whether said filtering septum is damaged, for example whether it has damage at an early stage (abrasions or micro-lesions) and/or at an advanced stage (macro-lesions), and/or to perform a predictive assessment of its residual duration.

For example, the electronic processing unit can be configured to determine, based on images of each of the filtering septa 140 and 145, the state of wear of the filtering septum and/or to predict how many filtration cycles the filtering septum can still perform before it becomes damaged or otherwise inefficient.

In practice, the electronic processing unit will be able to detect any defects in the filtering septa 140 and 145 in advance, even before the defect can develop into permanent damage to the containment plate 105 behind.

The determination of the residual duration can be performed by the electronic processing unit by executing a suitable evaluation logic, for example based on a suitably trained artificial intelligence algorithm, which receives the images of the filtering septum 140 or 145 as input and automatically provides its residual duration as output.

This evaluation logic can also take into account other aspects, such as the degree of abrasiveness of the liquid to be filtered and/or the filtration pressures.

The residual duration can then be communicated to the operators, for example by means of an interface system, so that they can plan the replacement of the different filtering septa 140 and 145.

By way of example, the evaluation logic used by the electronic processing unit may be based on a model (e.g. mathematical, statistical or empirical) describing the wear pattern of the filtering septa 140 and 145 with respect to the time of use or the number of filtration cycles performed.

This model can be modified/updated by the electronic processing unit by means of a self-learning process which, by analysing and/or processing the (historical) images of each filtering septum 140 and 145 taken by the screening system at successive times, that is after a progressively increasing number of filtration cycles have been carried out, is able to understand the evolution of the wear of the filtering septa 140 and 145 over time. In other words, after acquiring a plurality of images of a plurality of said filtering septa 140 and 145 at successive times, the electronic processing unit will advantageously be able to use all these images, for example by means of the aforementioned artificial intelligence-based self-learning process, to modify the model on which the residual duration assessment logic is based.

In this way, the model will be constantly updated and can be more faithful to the real behaviour of the filter press 100.

Obviously, a person skilled in the art may make several technical-applicative modifications to all that above, without departing from the scope of the invention as claimed hereinbelow.

The invention claimed is:

1. A filter press comprising:

a plurality of filtration chambers aligned along a predetermined longitudinal direction, each of which is delimited by two mutually facing filtering septa interposed between a pair of containment plates, a movement apparatus adapted to move each pair of containment plates along said longitudinal direction, between a closed configuration, in which the containment plates are clamped into a pack on the respective filtering septa closing the filtration chamber, and an open configuration, in which the containment plates are spaced apart so as to separate the respective filtering septa laterally opening the filtration chamber, an inlet hydraulic circuit adapted to feed a liquid to be filtered inside each filtration chamber, when all the pairs of containment plates are in the closed configuration, an outlet hydraulic circuit adapted to discharge the filtered liquid leaving each filtration chamber through the respective filtering septa, when all the pairs of containment plates are in the closed configuration, and a washing robot adapted to wash the filtering septa that delimit each filtration chamber, when the respective pair of containment plates is in the open configuration, wherein said washing robot comprises:

a trolley adapted to move along said longitudinal direction with respect to the containment plates, a bar installed on the trolley and movable relative thereto in a transverse direction with respect to the longitudinal direction, in order to slide between the filtering septa interposed between the pair of containment plates in the open configuration, and a plurality of nozzles installed on said bar to dispense jets of a washing liquid toward said filtering septa, characterized in that it further comprises:

a plurality of identification codes, each of which is fixed to at least one respective filtering septum, a device for detecting said identification codes installed on the trolley of the washing robot, at least one image acquisition device installed on the bar of the washing robot to acquire images of said filtering septa, and an electronic processing unit connected to the identification code detection de-vice and to the image acquisition device.

2. A filter press according to claim 1, wherein said electronic processing unit is configured to:

identify at least one filtering septum by detecting the corresponding identification code by the detection device, acquire with the acquisition device at least one image of said filtering septum, determine, on the basis of said at least one image, the presence of any damage to said filtering septum.

3. A filter press according to claim 1, wherein said electronic processing unit is configured to:

identify at least one filtering septum by detecting the corresponding identification code by the detection device, acquire with the acquisition device at least one image of said filtering septum, determine, on the basis of said at least one image, a residual duration of said filtering septum.

4. A filter press according to claim 3, wherein the electronic processing unit is configured to determine the residual duration of the filtering septum by performing an assessment logic that receives as input said at least one image and supplies as output the residual duration.

5. A filter press according to claim 4, wherein the processing unit is configured to:

acquire in successive times with the acquisition device a plurality of images of a plurality of said filtering septa, modify the assessment logic based on these images.

6. A filter press according to claim 1, comprising a second plurality of identification codes, each of which is fixed to a respective containment plate and is adapted to be detected by the identification code detection device.

7. A filter press according to claim 1, wherein each identification code is incorporated in an RFID tag and wherein said detection device comprises an antenna adapted to pick up a radio signal emitted by said RFID tag.

8. A filter press according to claim 6, wherein said RFID tag is of a writable type.

9. A filter press according to claim 6, wherein said detection device comprises a reader connected to the antenna and adapted to decode the radio signal emitted by the RFID tag.

10. A filter press according to any one of the claim 1, wherein said image acquisition device is a video camera or a camera.

11. A filter press according to claim 1, comprising at least a first image acquisition device turned toward one of said filtering septa, and a second image acquisition device turned toward the other filtering septum.

12. A method for operating a filter press according to claim 1, comprising the steps of:

stopping the trolley of the washing robot at a pair of containment plates in the open configuration, detecting with the detection device the identification code of at least one of said filtering septa interposed between said pair of containment plates, moving the bar of the washing robot between the filtering septa interposed between said pair of containment plates, acquiring at least one image of said filtering septum by means of the image acquisition device installed on the bar of the washing robot.

* * * * *